United States Patent
Wang et al.

(10) Patent No.: US 11,186,497 B2
(45) Date of Patent: Nov. 30, 2021

(54) METHOD AND DEVICE FOR WATER EVAPORATION

(71) Applicant: KING ABDULLAH UNIVERSITY OF SCIENCE AND TECHNOLOGY, Thuwal (SA)

(72) Inventors: Peng Wang, Thuwal (SA); Yifeng Shi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/756,246

(22) PCT Filed: Sep. 21, 2018

(86) PCT No.: PCT/IB2018/057330
§ 371 (c)(1),
(2) Date: Apr. 15, 2020

(87) PCT Pub. No.: WO2019/081998
PCT Pub. Date: May 2, 2019

(65) Prior Publication Data
US 2020/0255303 A1     Aug. 13, 2020

Related U.S. Application Data

(60) Provisional application No. 62/576,251, filed on Oct. 24, 2017.

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0005* (2013.01); *B01D 1/0035* (2013.01); *B01D 1/22* (2013.01);
(Continued)

(58) Field of Classification Search
CPC .......... C02F 1/08; C02F 1/14; C02F 2103/08; C02F 2201/009; B01D 1/0005; B01D 1/0035; B01D 1/22
See application file for complete search history.

(56) References Cited

U.S. PATENT DOCUMENTS 2,402,737 A * 6/1946 Delano ..................... C02F 1/14
                                                     203/10
2,445,350 A * 7/1948 Ginnings .................. C02F 1/18
                                                     202/172
(Continued)

FOREIGN PATENT DOCUMENTS

CA       2347456 A1    11/2001

OTHER PUBLICATIONS

Deng, Z., et al., "The Emergence of Solar Thermal Utilization: Solar-Driven Steam Generation," Journal of Materials Chemistry A, Mar. 25, 2017, Issue 17, pp. 7691-7709.
(Continued)

*Primary Examiner* — Jonathan Miller
(74) *Attorney, Agent, or Firm* — Patent Portfolio Builders PLLC (57) ABSTRACT

A solar-powered system includes a support portion; and an evaporation portion having a pumping layer and a photothermal layer. The support portion pumps a fluid to the evaporation portion, the pumping layer evaporates the fluid based on solar power; and the photothermal layer is insulated from the pumping layer.

20 Claims, 8 Drawing Sheets

(51) Int. Cl.
*B01D 1/22* (2006.01)
*C02F 1/08* (2006.01)
*C02F 103/08* (2006.01)

(52) U.S. Cl.
CPC .......... *C02F 1/08* (2013.01); *C02F 2103/08* (2013.01); *C02F 2201/009* (2013.01)

(56) References Cited

U.S. PATENT DOCUMENTS

| | | | | |
|---|---|---|---|---|
| 2,455,834 A * | 12/1948 | Ushakoff | ........... | C02F 1/14 202/234 |
| 3,159,554 A * | 12/1964 | Mount | ........... | C02F 1/14 202/234 |
| 3,501,381 A * | 3/1970 | Delano | ........... | C02F 1/14 202/83 |
| 3,878,054 A * | 4/1975 | Rodgers | ........... | C02F 1/14 203/11 |
| 4,323,052 A * | 4/1982 | Stark | ........... | F24S 30/40 126/571 |
| 4,329,204 A * | 5/1982 | Petrek | ........... | C02F 1/14 202/174 |
| 4,329,205 A * | 5/1982 | Tsumura | ........... | B01D 1/26 202/174 |
| 4,421,606 A * | 12/1983 | Tsumura | ........... | C02F 1/14 203/10 |
| 4,475,988 A * | 10/1984 | Tsumura | ........... | B01D 1/26 202/174 |
| 4,504,362 A * | 3/1985 | Kruse | ........... | F24S 23/74 203/3 |
| 6,663,750 B1 * | 12/2003 | Coon | ........... | B01D 1/0005 202/234 |
| 8,673,119 B2 * | 3/2014 | Lee | ........... | B01D 1/0035 203/98 |
| 9,259,662 B2 * | 2/2016 | Lee | ........... | B01D 5/0006 |
| 9,770,672 B2 * | 9/2017 | Peever | ........... | E02B 11/00 |
| 10,093,552 B2 * | 10/2018 | Lee | ........... | H02S 40/44 |
| 2011/0120854 A1 * | 5/2011 | Lee | ........... | B01D 1/0035 203/86 |
| 2012/0298499 A1 * | 11/2012 | Lee | ........... | B01D 3/00 203/10 |
| 2015/0353379 A1 * | 12/2015 | Lee | ........... | B01D 3/007 203/10 |

OTHER PUBLICATIONS

Finnerty, C., et al., "Synthetic Graphene Oxide Leaf for Solar Desalination with Zero Liquid Discharge," Environmental Science & Technology, Sep. 11, 2017, Issue 51, p. 11701-11709.

Manchanda, H., et al., "A Comprehensive Decade Review and Analysis on Designs and Performance Parameters of Passive Solar Still," Renewables: Wind, Water, and Solar, Nov. 11, 2015, vol. 2, Article No. 17, 24 pages.

International Search Report in corresponding/related International Application No. PCT/IB2018/057330, dated Nov. 28, 2018.

Written Opinion of the International Searching Authority in corresponding/related International Application No. PCT/B2018/057330, dated Nov. 28, 2018.

First Office Action in corresponding/related Chinese Application No. 201880069163.1, dated Apr. 15, 2021.

* cited by examiner

METHOD AND DEVICE FOR WATER EVAPORATION

CROSS-REFERENCE TO RELATED APPLICATIONS

This application is a U.S. National Stage Application of International Application No. PCT/IB2018/057330, filed on Sep. 21, 2018, which claims priority to U.S. Provisional Patent Application No. 62/576,251, filed on Oct. 24, 2017, entitled "METHOD AND DEVICES FOR ENHANCED WATER EVAPORATION FROM SALTY AQUEOUS SOLUTION BY USING SUNLIGHT AS ENERGY SOURCE," the disclosures of which are incorporated herein by reference in their entirety.

BACKGROUND

Technical Field

Embodiments of the subject matter disclosed herein generally relate to methods and devices for water evaporation, and more specifically, to methods and systems for enhancing water evaporation from salty aqueous solutions using sunlight as energy source.

Discussion of the Background

Sunlight is the most abundant and accessible renewable energy source. The annual solar energy incident on the Earth's surface is $10^4$ times the current annual global energy consumption. One of the promising options to utilize solar energy is the solar-driven water evaporation, also known as solar steam generation. This method is widely utilized in various applications. The most important application is the solar distillation, which uses solar-driven water evaporation to produce steam and then collects the condensate as fresh water.

Solar distillation is able to effectively deal with a variety of water sources, including seawater, industrial wastewater, brine, brackish water, etc. Unlike other water-related technologies, solar distillation does not involve any moving parts, electronic devices and high pressure operations, which makes it attractive and economical especially for small to medium scale applications. The solar-driven water evaporation process also has a great potential for many types of water removal processes, such as in wastewater treatment, to reduce the volume of the wastewater and to incidentally obtain fresh water, especially in oil and energy sectors.

Figure 1:
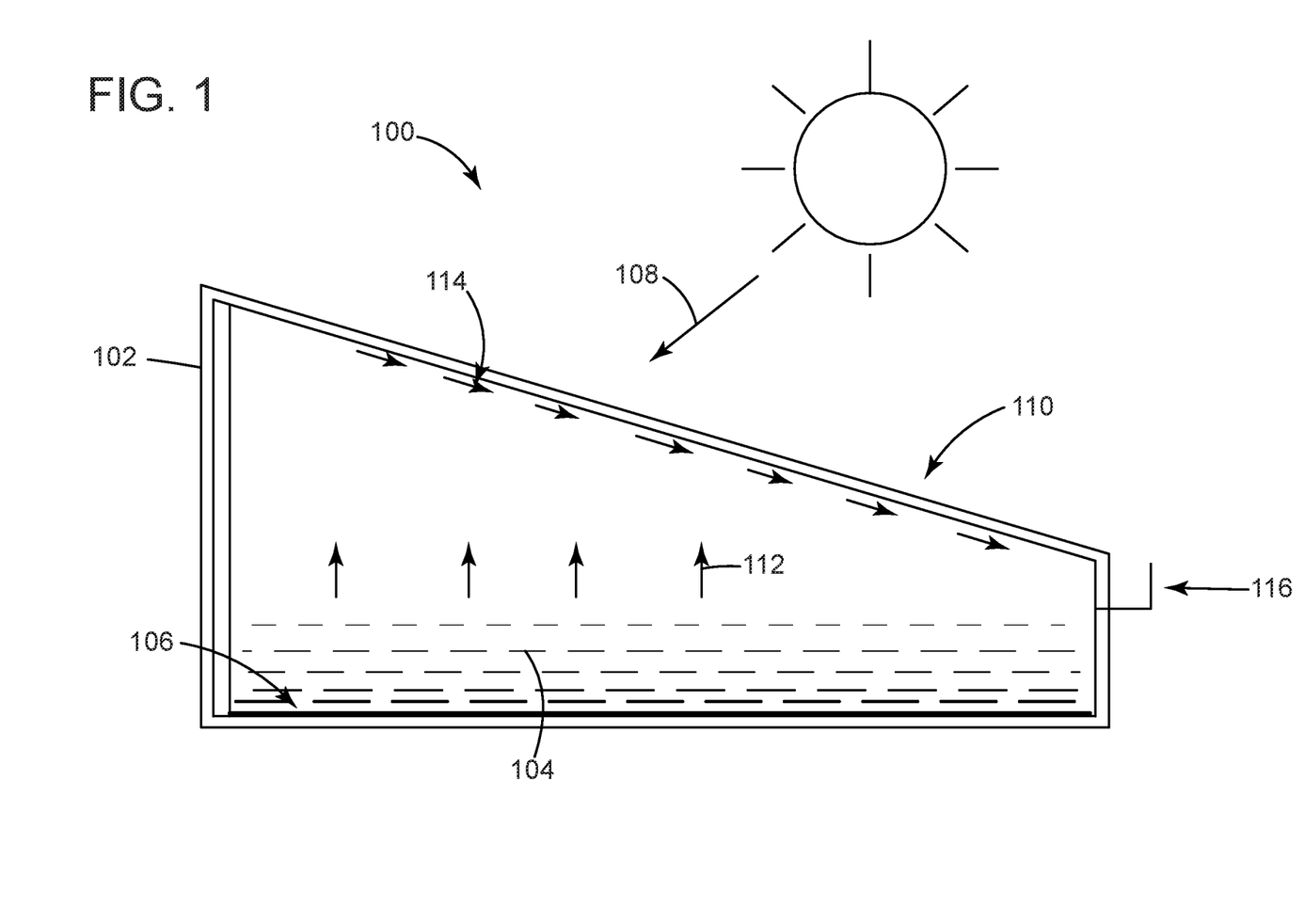
FIG. 1 illustrates a traditional solar still.

A conventional passive solar still (see "Renewables: Wind, Water, and Solar," A comprehensive decade review and analysis on designs and performance parameters of passive solar still, December 2015) 100, as illustrated in FIG. 1, has a container 102 that holds water 104. A black photothermal paint 106 that absorbs sunlight 108 is coated on the bottom of the container 102. The top of the container 102 is covered with a glass 110 for allowing the sunlight to enter inside the container and heat the water. The water source 104 sits on top of the photothermal paint 106. The sunlight 108 enters through the glass cover 110 and hits the water surface first, before reaching the bottom photothermal layer 106. The entire water source 104 is slowly heated up during daytime due to the direct exposure to the sunlight and also due to the heat released by the photothermal paint 106.

Part of the water source 104 evaporates forming vapors 112, which move upward and arrive at the glass cover 110. Because the glass cover is cooler than the water vapors, the water vapors condensate on the glass cover, forming a condensate 114. The condensate 114 includes pure (distilled) water. All the impurities and/or salts from the water source 104 are left with the water source. The purified water 114 falls due to the gravity (the glass cover is tilted) to an output 116. In this way, pure water is separated from the water source 104. Note that the water source 104 may be a mixture of water and any other substances.

This is not a zero-liquid-discharge process as the concentrated source water 104 has to be disposed before the formation of salt crystal on top of the photothermal layer 106 to avoid a cleaning operation. Furthermore, in a conventional solar still as illustrated in FIG. 1, as the water evaporation goes on, the salt concentration increases in the water source 104, which undesirably decreases the water evaporation rate and therefore degrades the system's performance.

In industrial practice, disposal of brine water is chosen instead of drying out the source water completely in solar-still based operations. Disposal of a small quantity of brine is not a problem, but brine disposal at a large scale is a great challenge because a continuous disposal of highly concentrated brine on land or sea would cause soil salinization, affect vegetation, and impact the health of marine life. Most of the current clean water production technologies, such as reverse osmosis (RO), membrane distillation (MD), ion exchange, etc., generate a large quantity of brine wastewater and the water production plants using these technologies are all facing great challenge in brine disposal management.

In the last decade, the interfacial heating idea was introduced to the solar-driven water evaporation processes to reduce heat loss and to ensure a fast response in steam generation by concentrating all of the heat that is generated by the photothermal materials within a thin top surface water layer (see, "The emergence of solar thermal utilization: solar driven steam generation," J. Mater. Chem. A, 2017, 5, 7691-7709). Unlike in the conventional solar still method discussed above, the photothermal material 106 is placed on top of the water surface in this method. In some of the variations of this method, the source water is pulled up from a bulk water body by capillary effect, in a confined water path, to diminish the heat loss by decreasing the heat transfer from the top water layer to the water body. The advantage of this type of design is that the energy utilization efficiency is greatly increased.

In all of the existing interfacial heating photothermal system designs, there is one commonality: the light adsorption surface of the photothermal material is physically/geometrically the same as the water evaporation surface. In these designs, the photothermal material is located right at the water/air interface and the water evaporates directly above/from the photothermal material surface and into the overlying air.

However, there is an intrinsic problem as a result of these designs. Salt crystallization and solid precipitation appear on the surface of the photothermal material as water evaporates, leaving behind solid deposits on the surface of the photothermal material. As the amount of crystallized salt and other solids accumulates on the photothermal material surface, the light capture capability of the photothermal material is suppressed considerably, which would necessitate frequent physical cleaning and rinsing of the salt/solid off the surface.

It has been reported that as the salt accumulated on a graphene-oxide (GO) photothermal membrane, the water evaporation rate was reduced from 2.0 to 0.5 kg·m²/h, representing a 75% decrease in performance (see, Environmental Science & Technology 2017 Sep. 27, doi: 10.1021/acs.est.7b03040).

Thus, the existing methods and devices are limited in the sense that their efficiency decreases over time as the salt accumulates on the light absorbent material. Therefore, there is a need for a method and device for water purification that overcomes the limitations noted above.

SUMMARY

According to an embodiment, there is a solar-powered system that includes a support portion and an evaporation portion having a pumping layer and a photothermal layer. The support portion pumps a fluid to the evaporation portion, the pumping layer evaporates the fluid based on solar power; and the photothermal layer is insulated from the pumping layer.

According to another embodiment, there is a solar-powered system that includes a support portion and an evaporation portion having a pumping layer and a transparent non-porous, layer covering a first face of the pumping layer. The support portion pumps a fluid to the evaporation portion, and the pumping layer evaporates the fluid at a second face, opposite the first face, based on solar power.

According to yet another embodiment, there is a method for evaporating water from a source, the method including a step of placing a solar-powered system into a water source, and a step of evaporating water from the water source with the solar-powered system. The solar-powered system includes a support portion and an evaporation portion having a pumping layer and a photothermal layer. The photothermal layer is insulated from the pumping layer.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a solar-powered system that is used to evaporate water from a water source. However, the invention is not limited to this scenario, but it may be used to evaporate water of another fluid from a fluid source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, the photothermal material part, which is responsible for light adsorption, and the water evaporation surface of a solar-powered system are physically separated from each other so that the salt that is formed due to the water evaporation does not contaminate the photothermal material part. This novel configuration provides a rational solution to the long-standing problem of salt solid-accumulation-led-performance-degradation in solar distillation systems. This novel design offers a variety of options to suits varying application purposes, including solar desalination with zero-liquid discharge, salt recovery from wastewater, salt mineral extraction from salt lakes, and brine treatment for all kind of water plants.

Figure 2:
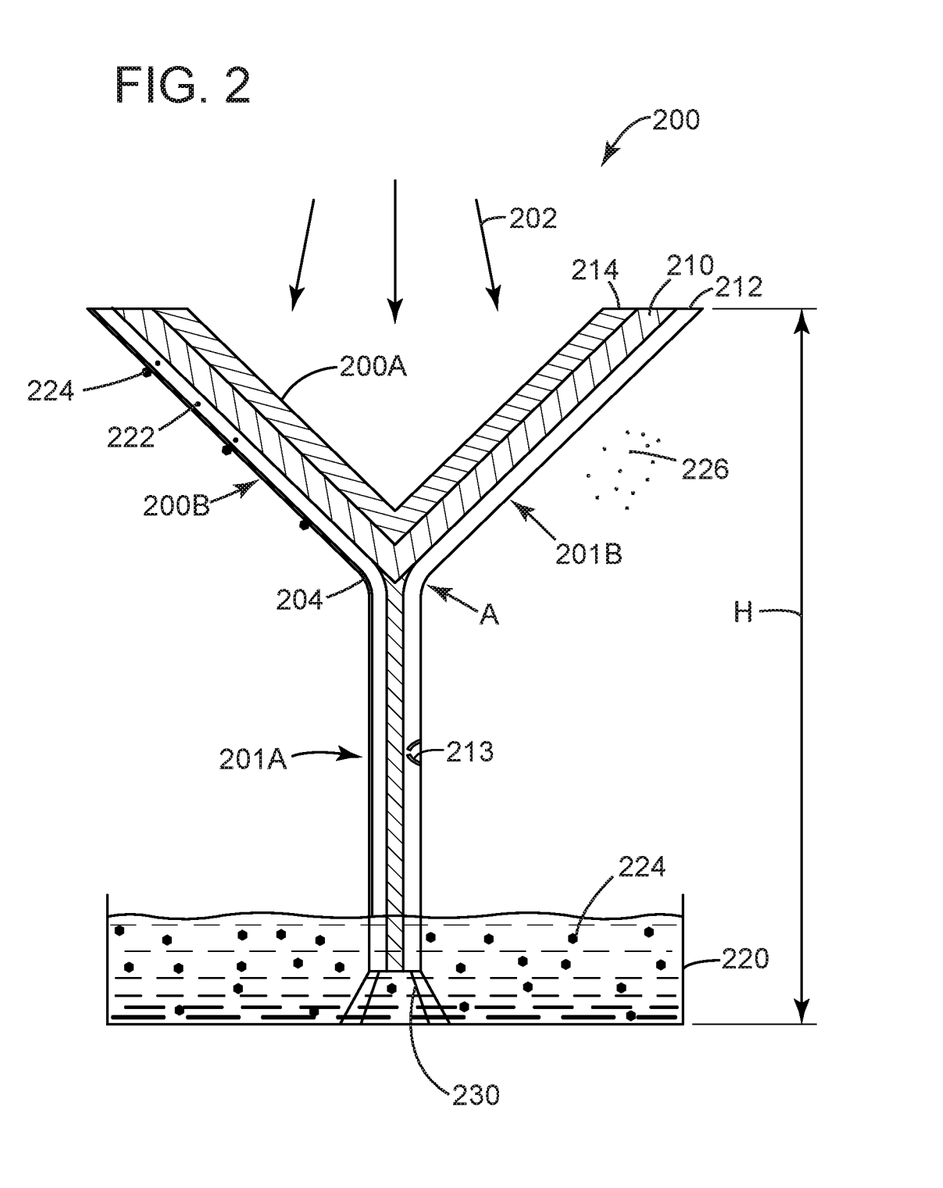
FIG. 2 illustrates a solar-powered system that has a pumping and evaporation layer separated from a photothermal layer.

FIG. 2 shows a schematic of a solar-powered system 200 that prevents the accumulation of salt/solid on the surface of the photothermal material by separating the water evaporation interface, where the salt/solid accumulation takes place, from the light incident interface of the photothermal material. According to this embodiment, the solar-powered system 200 (called system herein) has a support portion 201A and an evaporation portion 201B. The evaporation portion 201B, as discussed later, is responsible for absorbing and transforming the sunlight into heat and using the heat to evaporate the water. The evaporation portion 201B is shown in FIG. 2 as being cup-shaped and being attached and supported by the support portion 201A. The evaporation portion 201B has an inner surface 200A that bears the function of absorbing light 202 and generating heat while the outer surface 200B is endowed with the function of evaporating the water at a water evaporation interface 204. The water evaporation interface 204 is defined as a border or boundary between the water in the liquid phase and water in the vapor phase (the vapors happen because of the evaporation of the water in the liquid phase). The water evaporation interface may coincide or not with the outer surface 200B of the evaporation portion 201B.

With the solar-powered system 200 of FIG. 2, the salt crystallization and solid accumulation occurs only on the outer surface 200B and therefore, it will not affect the light absorption capability of the inner surface 200A. Results of a few experiments carried on for the system shown in FIG. 2 have shown that in this case, the salt 224 is loosely accumulated on the outer surface 200B, at the water evaporation interface 204, and thus does not significantly affect the water evaporation rate therein.

The wall of the evaporation portion 201B of the system 200 is a multilayered structure that includes, in this embodiment, a support layer 210, a pumping layer 212, and a photothermal layer 214. The support layer 210 may be made of any material (e.g., metal or composite or plastic, etc.) that has enough mechanical strength to support the pumping and photothermal layers. As the entire system may have a height H between 5 cm to 10 m (even higher), it is up to the support layer 210 to maintain the cup shape of the system. Note that the support layer 210 in this embodiment extends in both the support portion 201A and the evaporation portion 201B, i.e., the support layer 210 extends all the way through the system 200. However, in one embodiment, it is possible that the support layer 210 extends only from the top of the system to point A (only in the evaporation portion 201B), and the pumping layer 212 acts as a support element for the top (cup) portion of the system. The support layer 210 also has the scope of physically separating the pumping layer 212 from the photothermal layer 214. For transferring the heat from the heat photothermal layer 214 to the pumping layer 212, the support layer 210 may have a thermal conductivity of at least 1 W m$^{-1}$ k$^{-1}$.

The pumping layer 212 is configured to "pump" (or supply) water from a source 220 (the source may be a container, the sea, ocean, lake, etc.) to the evaporation portion 201B of the system. The pumping may be passive or active. A passive pumping is achieved by using capillarity, i.e., the pumping layer may have plural small channels (or may be porous) 213 (only two are illustrated for simplicity, but one skilled in the art would understand that there are many small channels that extend all the way from the source 220 to the top of the pumping layer). In this way, the fluid (typically water) 222 from the solution 224 (e.g., brine) stored by source 220 is transported (pumped) to a proximity of the photothermal layer 214.

In other words, the solar-powered system 200 includes a support portion 201A and an evaporation portion 201B having a pumping layer 212 and a photothermal layer 214. The support portion 201A pumps the water 222 to the evaporation portion 201B and the pumping layer 212 evaporates the water 222 based on the solar power. The photothermal layer 214 is insulated from the pumping layer 212 either by another layer 210, or by other means, as discussed later.

Figure 3:
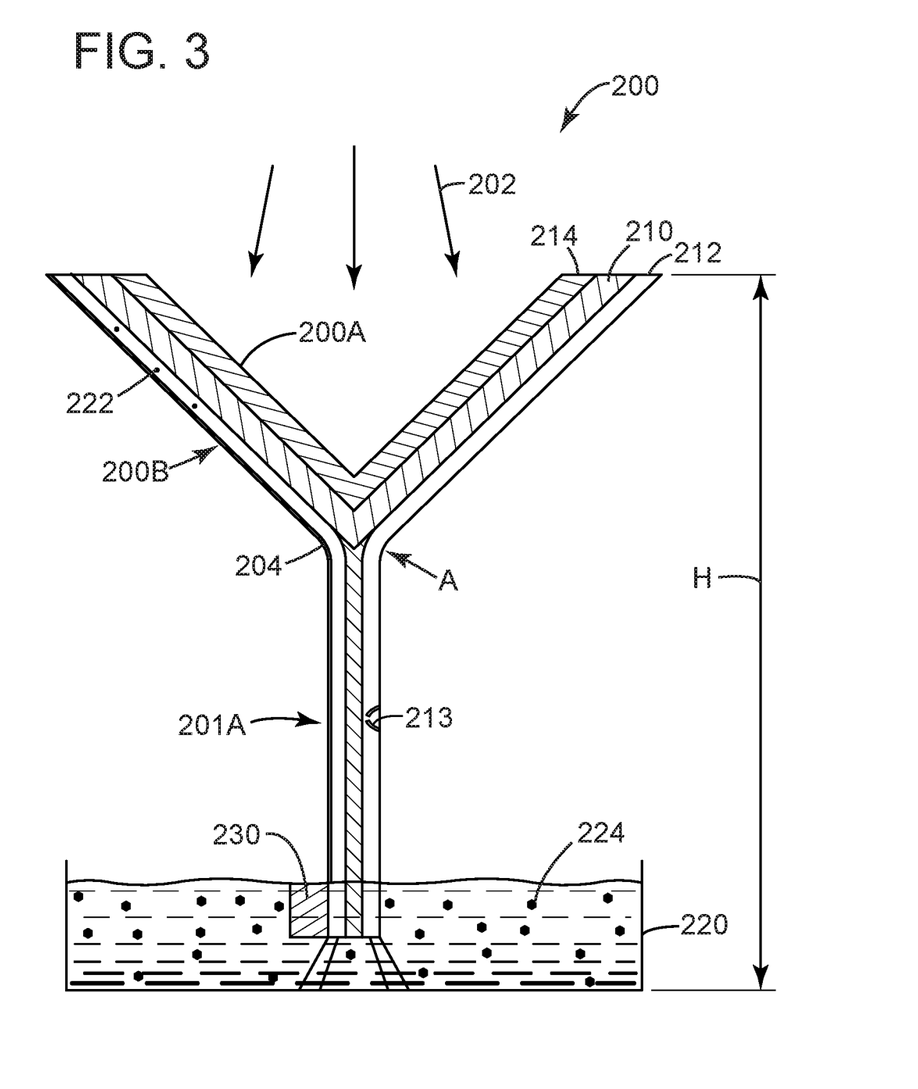
FIG. 3 illustrates another solar-powered system that has a pumping and evaporation layer separated from a photothermal layer.

An active pumping may be achieved by using a motor 230 and one or more pipes 232, as illustrated in FIG. 3, for mechanically pumping the fluid 222 from the solution 224 to the proximity of the photothermal layer 214. Other mechanisms may be used for actively pumping the fluid 222 to the proximity of the photothermal layer 214.

The photothermal layer 214 is located on the support layer 210, opposite to the pumping layer 212. The photothermal layer 214 is configured to capture sunlight 202 from the sun and convert it to heat. The photothermal layer 214 can be a porous or nonporous material. The photothermal layer 214 is directly exposed to the sunlight.

In case that the photothermal layer 214 is porous, the other functionality of the support layer 210 is to keep the water from the pumping layer 212 from getting into the photothermal layer 214, i.e., the support layer 210 has to be non-porous in this case to not transport the water from the outer surface 200B to the inner surface 200A. In case that the photothermal layer 214 is non-porous, the support layer 210 can be porous or non-porous or can be omitted. As discussed above, the pumping layer 212 is a porous layer for water evaporation. The pore size of this layer should be less than 1 mm to ensure a strong capillary force to pull water from the solution 224.

The water from the solution 224, which may be the salty source water of interest, such as sea water, brine water, and wastewater, spontaneously moves from the source 220 to the interface 204 (porous water evaporation layer) due to the capillary force and transpiration effect. Under the sunlight illumination, the photothermal layer 214 captures the sunlight 202 and converts the solar energy to heat. The heat energy is transferred to the support layer 210 and then to the pumping layer 212 and the interface 204 to accelerate the water evaporation rate there. The salt 224 will precipitate on the surface of the pumping layer 212 with a loosely stacked structure and it will drop off the outer surface from time to time without the need of manual intervention. In some cases, some additives need to be added to the source brine to control the structure of the salt crystal and thus, to make the salt easily removable. In some cases, the pumping layer 212 may need to be cleaned after a long time operation. After the water 222 evaporates, the water vapors 226 (see FIG. 2) may be recovered with known mechanisms (e.g., condensation mechanisms).

The entire system 200 may be attached with a support mechanism 230 to the source 220. In one application, the support mechanism includes a flange and bolts. In another application, the support mechanism 230 may be a floating platform (for example, a barge or a boat) that floats in the ocean (the source 220) and the system 200 extracts independently and autonomously distilled water from the sea water. In still another application, more than one system 200 is attached to the source 220. In yet another application, the system 200 is a small system (e.g., in the order of cm) and many such systems are released on a salty source (e.g., sea, ocean or a brine storage container) for separating the water from the salt. Those skilled in the art would understand that the device described in FIGS. 2 and 3 may be used for other chemical processes that require a source of energy.

Figure 4:
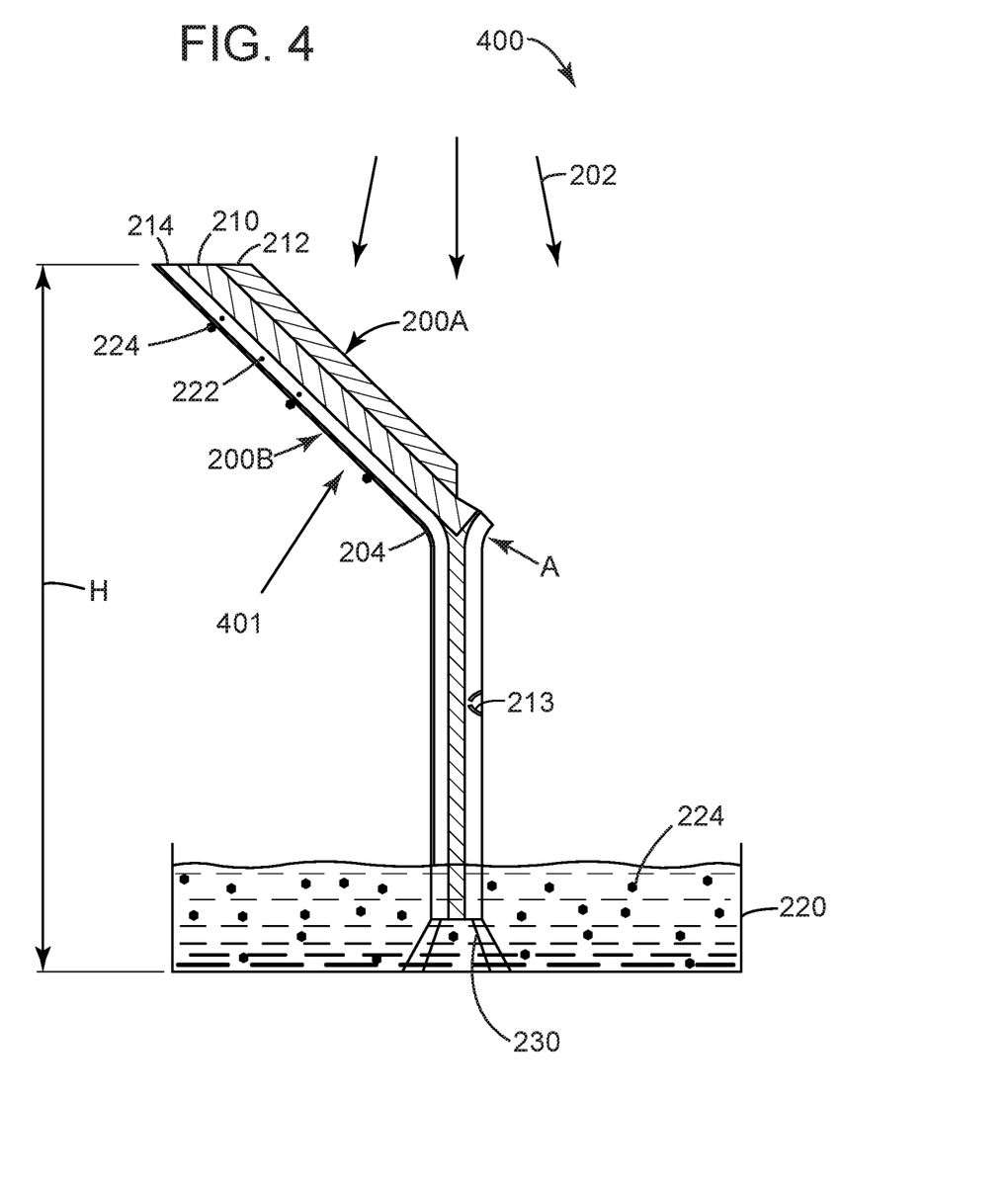
FIG. 4 illustrates a variation of the solar-powered system of FIG. 2.

The system 200 may be modified to have a different shape than the cup shape shown in FIG. 2. For example, as illustrated in FIG. 4, a similar system 400 may have only one arm 401. Although FIG. 2 shows the system 200 having two straight arms (in fact the system 200 in FIG. 2 has the evaporation portion shaped as a cup and the two arms correspond to a cross-section through the cap) and FIG. 4 shows the system 400 having a single straight arm, those skilled in the art would understand that these arms may be curved or more arms may be used (for example, plural arms that open up as the petals of a flower).

Figure 5:
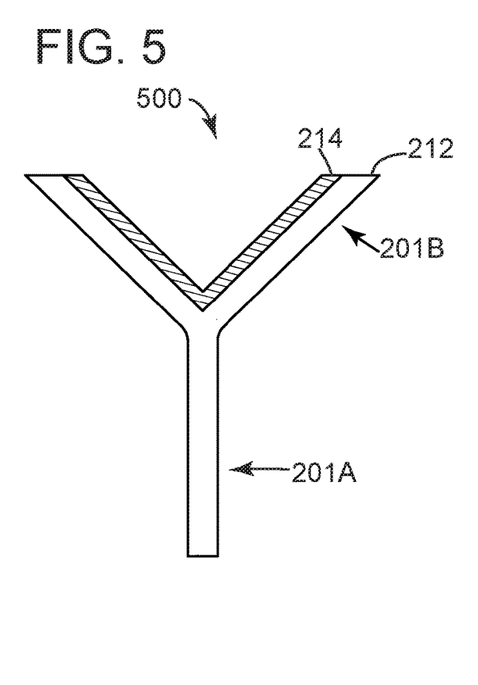
FIG. 5 illustrates another variation of the solar-powered system of FIG. 2.

Different configurations for the layers discussed above may be used. For example, FIG. 5 shows a configuration in which system 500 includes the photothermal layer 214 and the pumping layer 212, but no support layer 210. For this configuration, the photothermal layer 214 is nonporous. In this case, the support layer 210 is not needed. In other words, the photothermal layer 214 directly contacts with the pumping layer 212. The photothermal layer 214 or the pumping layer 212 or both is selected to provide the mechanical strength to support the entire structure.

Figure 6:
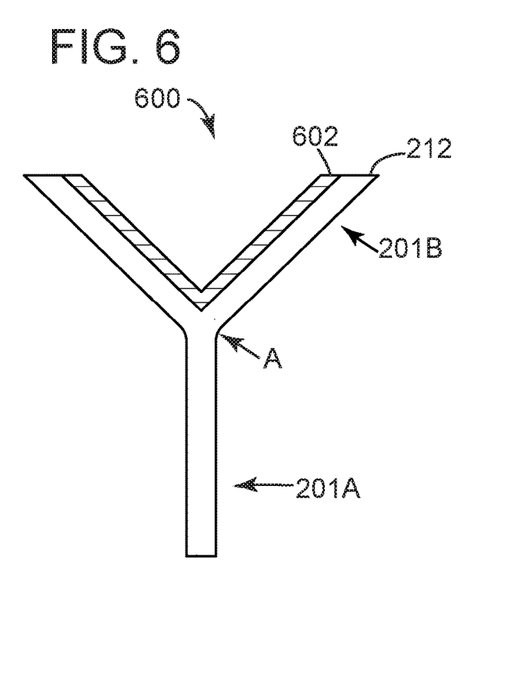
FIG. 6 illustrates yet another variation of the solar-powered system of FIG. 2.

FIG. 6 shows a system 600 for which the pumping layer 212 is porous and it acts as both the photothermal layer 214 and water evaporation layer at the same time. A nonporous transparent layer 602 is coated/covered on the sun receiving side of the pumping layer 212 to prevent water evaporation from and off the sun receiving side of the pumping layer and thus, to prevent the possibility of salt precipitation on the inner surface of the pumping layer. The nonporous transparent layer 602 can also be given the role of co-photothermal material to absorb sunlight to certain extent in this case. The mechanical strength of the system can be provided by the nonporous transparent layer 602, or by the pumping layer 212, or by both of them.

Figure 7:
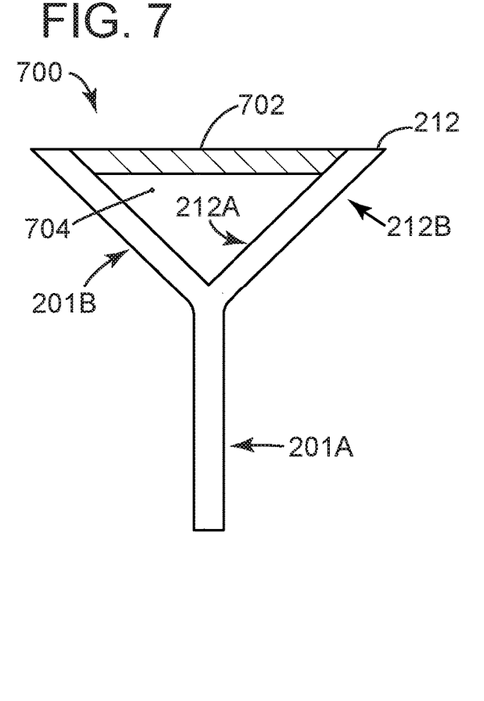
FIG. 7 illustrates still another variation of the solar-powered system of FIG. 2.

FIG. 7 shows a system 700 in which the pumping layer 212 is porous and acts as both the photothermal layer and the water evaporation layer at the same time. A transparent nonporous film or plate 702 (top cover) covers the top of the cup structure as shown in the figure and the top cover 702 keeps the water vapor from escaping from the cup structure. In other words, the top cover 702 forms a cavity 704 with the inner surface of the pumping layer 212. Thus, this structure prevents continuous water evaporation at the inner surface 212A of the pumping layer 212. The system 700 effectively stops the salt precipitation on the inner surface 212A of this structure and allows water evaporation and precipitation only on the outer surface 2128 of the pumping layer 212.

Figure 8:
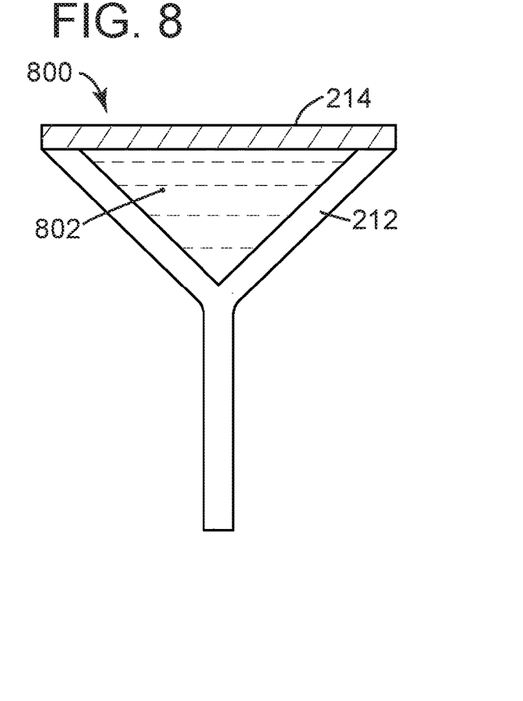
FIG. 8 illustrates another variation of the solar-powered system of FIG. 2.

FIG. 8 shows a system 800 having a solid cone structure. In this embodiment, the top layer is the photothermal layer 214, which captures sunlight and converts solar energy to heat. The middle layer 802 is a thermal conducting layer, which passes the heat from the photothermal layer 214 to the pumping layer 212. The pumping layer 212 may have a porous structure and acts as the water evaporation layer. The thermal conducting layer 802 fills in the entire cup of the evaporation portion.

Figure 9:
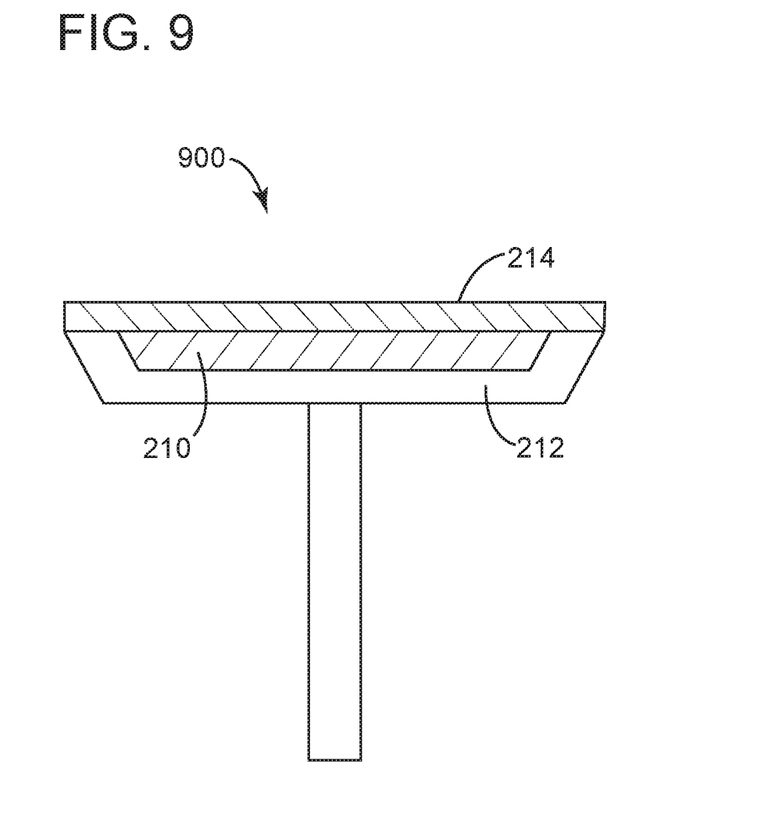
FIG. 9 illustrates yet another variation of the solar-powered system of FIG. 2.

FIG. 9 shows a system 900 in which the cup structure of the previous systems is changed to a solid disk structure. In this embodiment, the top layer is the photothermal layer 214, which captures sunlight and converts solar energy to heat. The middle layer is a thermal conducting layer 210, which passes the heat from photothermal layer 214 to the pumping layer 212. The pumping layer 212 possess a porous structure, acting as the water evaporation layer, as in the previous embodiments.

A common idea of these embodiments is to stop the continuous water evaporation on the surface of the photothermal layer facing the sunlight, and therefore, to prevent the surface of the photothermal layer from being covered by salts/solid. Thus, those skilled in the art, having the advantage of this document, would be able to design other systems that separate the water evaporation from the photothermal layer so that no salt is deposited on this layer.

The photothermal layer used in these embodiments may include all types of existing and potentially possible materials that have strong light absorption capability in the solar spectrum range, such as metal nanoparticle (gold, silver, copper, cobalt, iron, nickel, aluminum, and there alloys), carbon based materials (carbon black, carbon nanotubes, graphene, graphene oxide, reduced graphene oxide, etc.), black metal oxides ($Co_3O_4$, $MnO_2$, $Ti_2O_3$, $Fe_3O_4$, $CuCr_2O_4$, $FeCr_2O_4$, $CuMn_2O_4$, $MnFe_2O_4$, $ZnFe_2O_4$, $MgFe_2O_4$, etc.), black metal chalcogenides ($MoS_2$, $MoSe_2$, $WSe_2$, CdS, CdTe, etc.), black paint and black cement materials, and black polymer materials. The spectrally selective absorber materials of the photothermal layer are especially desired, which may provide best performance.

The water evaporation material of the pumping layer should be porous and hydrophilic to ensure strong water absorption capability and to make sure there is a strong capillary force to pull and spread water onto the entire water evaporation interface. This material may be paper, quartz glass fibrous membrane, carbon paper, copper foam, carbon foam, polymer foam, macroporous silica, etc. A thickness of any of these layers may be in the nanometer to centimeter range, except for the support layer, which may be thick enough to support the other layers.

During solar distillation application, a device incorporating any of the systems discussed above may be placed directly on top of the salty source water of interest and/or self-float there. The device may also be physically away from the salty water surface, with a water supply path (as shown in FIG. 2) provided by a hydrophilic porous materials (e.g., cotton, silica, polymer, metal oxides, carbon, etc.) to continuously deliver water to the water evaporation surfaces (e.g., the outer surface in all structures).

Figure 10:
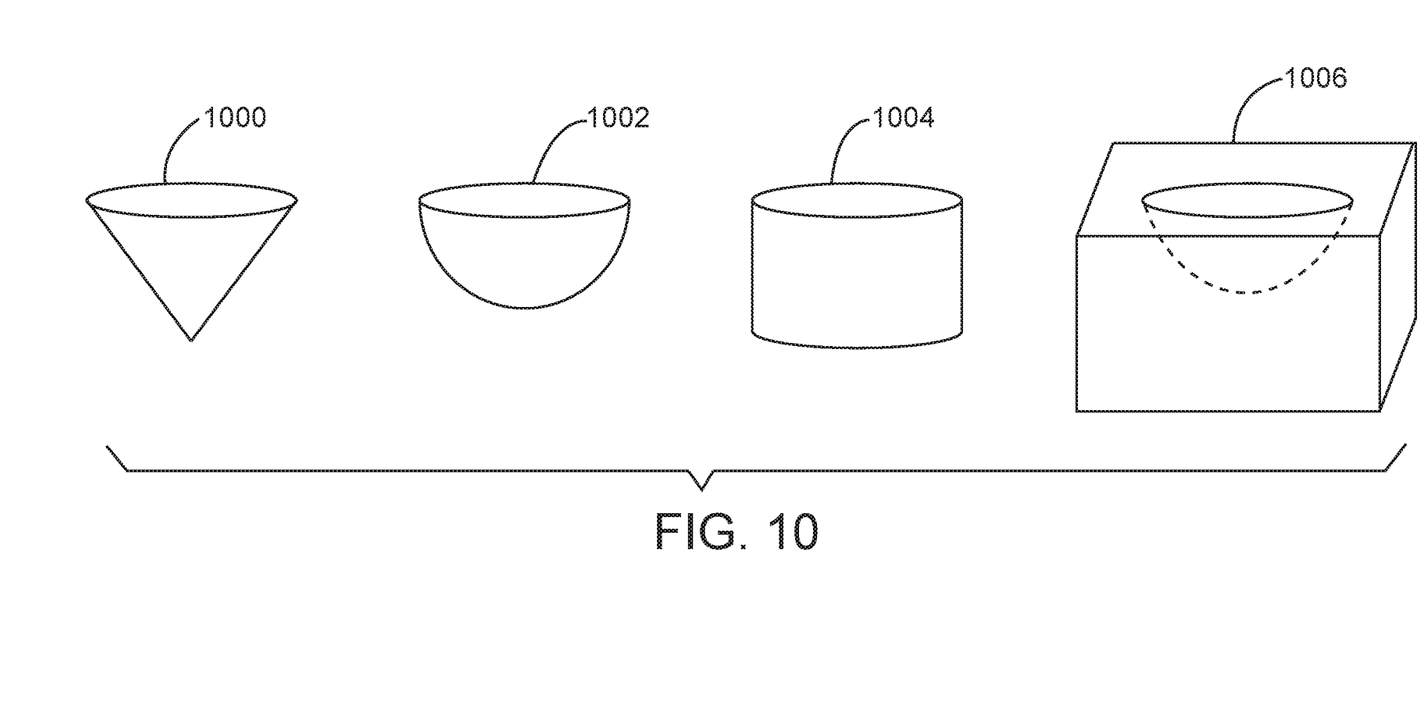
FIG. 10 illustrates various shapes of an evaporation portion of the solar-powered system.

Although same of the embodiments discussed above disclose a cup-shaped evaporation portion of the system, one skill in the art would understand that other shapes may be implemented for these systems. For example, as illustrated in FIG. 10, the evaporation portion of the system may have, instead of the conical shape 1000 used for the embodiment of FIG. 2, a semi-spherical shape 1002, a cylindrical shape 1004 or a cubical shape 1006.

Figure 11:
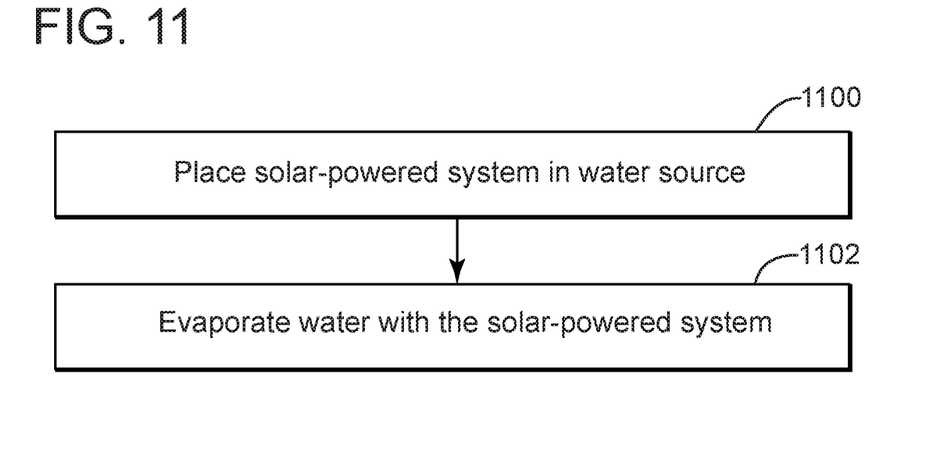
FIG. 11 is a flowchart of a method for evaporating water with a solar-powered system.

A method for evaporating water from a source, based on one of the systems discussed above, includes a step 1100 of placing a solar-powered system 200 into a water source 220 and a step 1102 of evaporating water 222 from the water source 220 with the solar-powered system. The solar-powered system includes a support portion 201A, and an evaporation portion 201B having a pumping layer 212 and a photothermal layer 214. The photothermal layer 214 is insulated from the pumping layer 212.

One or more of the advantages of the systems discussed above are as follow: (1) no water evaporation occurs on the light adsorption surface of the photothermal material and thus, no salt accumulates on the surface of the photothermal material that is facing the sunlight. Thus, the light adsorption performance in these systems is not affected by water evaporation and salt accumulation and therefore, there is no need for regular maintenance, which is expensive. A constant and non-degrading solar energy harvesting is thus achieved for the embodiments discussed above, which none of the current solar distillation systems is able to do. Thus, the rational of separating the light adsorption surface from the water evaporation surface would offer benefit for any practical solar distillation application. (2) The systems discussed above allow for the crystallized salt or other solids on the water evaporation surface to leave the surface on its own gravity, which minimizes human intervention. (3) Given the loose nature of the surface-water-evaporation-induced salt accumulation, the effect of the surface accumulated salt solid on the surface water evaporation rate is insignificant. (4) The surface of the water evaporation interface can be further modified to be salt-resistant so that salt crystal or other solids, once formed, would leave the surface immediately, leaving behind no solid residue. This would further improve the photothermal material's long-term operation performance.

Thus, the solar-distillation structures discussed above promise a constantly high photothermal performance, reduce the maintenance requirement of the system during applications, and extends the system's operation longevity, all leading to much reduced operational cost for the same level of products delivered.

The solar-driven water evaporation process used by the systems discussed above has three emerging application directions: (1) solar-driven seawater desalination, which, with its unmatched energy efficiency (i.e., 80% at lab scale), is regarded as having a potential of becoming the next-generation seawater desalination technology, especially for small scale plants; (2) brine treatment—brine disposal is a long-lasting problem in many industrial processes, including SWRO, mineral extraction, solar distillation, etc. These devices can be placed on top of the conventional evaporation pond to accelerate the water evaporation efficiency; and (3) salt extraction out of salty water for the purpose of metal salts mining from salt lakes or sea water and salt resource recovery from some waste salt water. This is a largely uncharted territory for solar-driven water evaporation, but represents a future growth point of the utilization of solar energy.

The disclosed embodiments provide methods and mechanisms for separating an evaporation interface from a photothermal layer. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A solar-powered system comprising:
a support structure; and
an evaporation portion having a pumping layer and a photothermal layer,
wherein the support structure is configured to support a weight of the evaporation portion and also to pump a fluid to the evaporation portion,
wherein the pumping layer evaporates the fluid based on solar power; and
wherein the photothermal layer is insulated from the pumping layer by being physically separated from the pumping layer.

2. The system of claim 1, further comprising:
a support layer located between the photothermal layer and the pumping layer.

3. The system of claim 2, wherein the support layer provides support for the photothermal layer and the pumping layer.

4. The system of claim 1, wherein the pumping layer is porous and absorbs through capillarity the fluid from a source.

5. The system of claim 1, wherein the evaporation portion is shaped as a cup.

6. The system of claim 1, wherein the pumping layer extends along the evaporation portion and the support structure.

7. The system of claim 1, further comprising:
an active pumping system for pumping the fluid to the evaporation portion.

8. The system of claim 1, wherein the evaporation of the fluid is powered only by the sunlight.

9. The system of claim 1, wherein salt left behind by an evaporation process forms on the pumping layer and not on the photothermal layer.

10. The system of claim 1, wherein the photothermal layer is non-porous and the pumping layer is porous and the photothermal layer is in direct contact with the pumping layer.

11. The system of claim 1, wherein both the pumping layer and photothermal layer are flat and horizontal and form a horizontal disk.

12. A solar-powered system comprising:
a support structure; and
an evaporation portion having a pumping layer and a transparent non-porous, layer covering a first face of the pumping layer,
wherein the support structure is configured to support a weight of the evaporation portion and also to pump a fluid to the evaporation portion, and
wherein the pumping layer evaporates the fluid at a second face, opposite the first face, based on solar power.

13. The system of claim 12, wherein the transparent, non-porous, layer is in direct contact with the pumping layer.

14. The system of claim 12, wherein the transparent, non-porous, layer allows sunlight to pass through to the pumping layer and prevents vapors from the pumping layer to escape toward the sunlight.

15. The system of claim 12, wherein the transparent, non-porous, layer makes a cavity with the pumping layer.

16. The system of claim 12, wherein the pumping layer also acts as a photothermal layer.

17. The system of claim 12, wherein the evaporation portion is shaped like a cup.

18. A method for evaporating water from a source, the method comprising:
placing a solar-powered system into a water source; and
evaporating water from the water source with the solar-powered system,
wherein the solar-powered system includes,
a support structure, and
an evaporation portion having a pumping layer and a photothermal layer,
wherein the photothermal layer is insulated from the pumping layer, and
wherein the support structure is configured to support a weight of the evaporation portion and also to pump a fluid to the evaporation portion.

19. The method of claim 18, further comprising:
pumping the water with the support structure to the evaporating portion.

20. The method of claim 18, further comprising:
evaporating the water with the pumping layer based exclusively on solar power transformed into heat by the photothermal layer.

* * * * *